United States Patent [19]
Fekete

[11] Patent Number: 6,047,662
[45] Date of Patent: Apr. 11, 2000

[54] PET ENCLOSURE

[76] Inventor: Devon S. Fekete, 13701 Borgman, Oak Park, Mich. 48237

[21] Appl. No.: 09/159,717

[22] Filed: Sep. 24, 1998

Related U.S. Application Data

[60] Provisional application No. 60/059,964, Sep. 25, 1997.
[51] Int. Cl.⁷ .............................. A01K 1/00; A01K 29/00
[52] U.S. Cl. ............................................................ 119/416
[58] Field of Search ........................................ 119/416, 417, 119/418, 419, 420, 428, 448, 455, 482, 484, 486, 500, 165

[56] References Cited

U.S. PATENT DOCUMENTS

| | | | |
|---|---|---|---|
| 3,919,978 | 11/1975 | Schaefer | 119/165 |
| 4,567,939 | 2/1986 | Dumbeck | 119/165 |
| 5,044,325 | 9/1991 | Miksitz | 119/165 |
| 5,134,972 | 8/1992 | Compagnucci | 119/165 |
| 5,307,761 | 5/1994 | Berger, III et al. | 119/165 |
| 5,315,964 | 5/1994 | Mimms et al. | 119/165 |
| 5,809,936 | 9/1998 | Wall | 119/165 |

*Primary Examiner*—Thomas Price
*Attorney, Agent, or Firm*—Weintraub & Brady, P.C.

[57] ABSTRACT

A pet enclosure apparatus includes a walled assembly and a floor defining an enclosure and for an air delivery system for conducting heat or cooled air into the enclosure. The enclosure accommodates a pet therewithin. The air delivery system may be associated with various sources of temperature controlled air, such as a heat register, a radiator, or the like. Temperature controlled air is conducted or delivered into the enclosure, thus controlling air temperature in the enclosure for a pet therewithin.

9 Claims, 1 Drawing Sheet

PET ENCLOSURE

CROSS-REFERENCE TO RELATED APPLICATIONS

This application claims the benefit of U.S. Provisional Application Ser. No. 60/059,964, filed Sep. 25, 1997, the disclosure of which is incorporated by reference.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to enclosures for pets. More particularly, the present invention relates to heated enclosures for domestic animals. Even more particularly, the present invention relates to enclosures for pets that are heated and/or cooled directly from duct registers or other means.

2. Prior Art

Pet owners often want to keep a pet within an enclosure in a room of the pet owner's home, rather than letting the pet roam freely. Furthermore, pets, such as cats, often seek out temperature control elements, and, therefore, tend to roost themselves on stoves, by heating and cooling registers, by furnaces, and in other potentially hazardous areas.

Several prior patents have addressed the concept of heated pet enclosures. Usually the prior art has been directed to an outdoor enclosure. For instance, U.S. Pat. No. 3,962,994, issued Jun. 15, 1976 to Petrucciani, entitled "DOG KENNEL MODULE", teaches a dog kennel attached to the outside of a building, with the wall between the kennel and the building comprising a window to enable two-way viewing between the interior of the kennel and the interior of the building. Air conditioning and heating lines, preferably attached to air conditioning and heating means inside the building, provide climate control for the interior of the kennel.

U.S. Pat. No. 5,148,767, issued Sep. 22, 1992 to Torchio, is entitled "WINDOW MOUNTED PET ENCLOSURE." The patent teaches a pet enclosure to be mounted to a window of a house or other building. The pet enclosure has a roof, a floor, an end wall, and two spaced side walls, with the side walls and the end wall having screens built thereinto and, optionally, windows to fit over the screens. The pet enclosure, optionally, further comprises a pullout drawer to fit between the floor of the device and a second floor of the device; the pullout drawer contains an electric heater, and the second floor of the device contains a perforated plate for conducting heat from the heater into the interior of the pet enclosure.

U.S. Pat. No. 5,261,350, issued Nov. 16, 1993 to Vavrek, is entitled "DWELLING ADDITION PET ENCLOSURE." The patent teaches a pet enclosure to be mounted to the outside of a dwelling at a wall service opening. The pet enclosure comprises an enclosure member comprising a support boot having floor ventilation and an access opening, a security sleeve, a service access door, and an enclosure body and roof; a seal; and a pair of cover plates, which are employed alternately of the cover member.

It is readily appreciated that each of the above devices teaches an outdoor heating enclosure without concern for cooling. What is needed is an enclosure for a pet, with the enclosure being readily heated or cooled and which may be used either indoors or outdoors. The present invention provides such a device.

BRIEF SUMMARY OF THE INVENTION

The present invention addresses the affinity of some animals for particular environmental qualities such as warmth or cooling by connecting an enclosure for a pet directly to such a source. In this way, the pet gets the benefit of the heat from the heat source while remaining enclosed in the enclosure.

In its broadest aspect, the present invention is an enclosure apparatus for a pet, the apparatus comprising:
 (a) an animal enclosure, and
 (b) means for conducting temperature controlled air into the enclosure. from an external source.

The enclosure accommodates a pet therewithin. The means for conducting, preferably, comprises a duct having a first end connect to the enclosure and a second operatively connectable to a residential heat register, radiator, or the like.

For a more complete understanding of the present invention, reference is made to the following detailed description and accompanying drawings. In the drawings, like reference characters refer to like parts through the several views, in which:

DETAILED DESCRIPTION OF THE INVENTION

As noted above, the present invention is a heated enclosure apparatus for a pet, the apparatus comprising:
 (a) an animal enclosure, and
 (b) means for conducting temperature controlled air into the enclosure from an external source.

Figure 1:
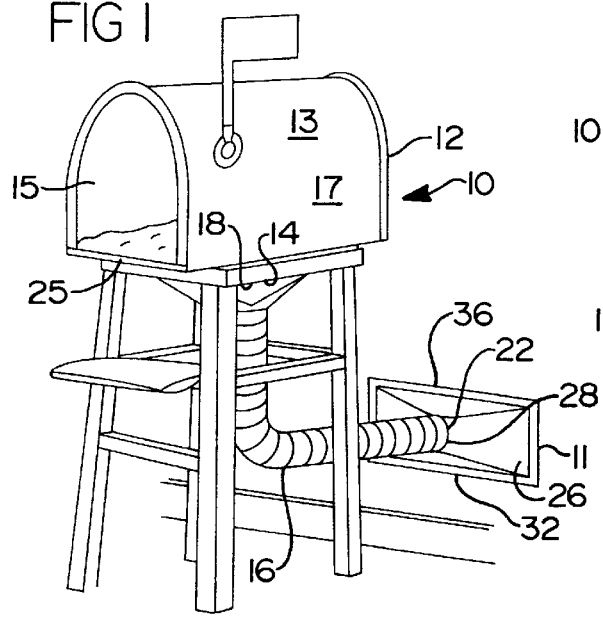
FIG. 1 is an environmental view of a first embodiment of a heated enclosure apparatus for a pet in accordance with the present invention.

More particularly, referring now to FIG. 1, there is shown a first embodiment of an enclosure apparatus in accordance with the present invention, and depicted, generally, at 10. The apparatus 10 comprises an animal enclosure 12 and means for conducting temperature controlled air into the enclosure 11.

The enclosure 12 comprises a walled assembly 13 and a floor 25 surrounding a hollow interior. The wall 13 and the floor 25 are, separately formed and joined by any convenient means of attachment, such as screws of the like. Alternately, the walled assembly 13 and the floor 25 may be integrally formed or otherwise fitted to each other. A first aperture 14 preferably, formed through the floor 25 and is used to conduct air into the exterior. A second aperture of portal 15 is formed in the walled assembly 13. The second aperture 15 is sufficiently large that a pet, such as a cat, may enter and leave the enclosure 12 therethrough.

The means for conducting air, preferably, comprises a duct or hollow tube 16 and a hollow connector 26. The duct 16 has a first open end 18 and a second open end 22 opposite the first open end 18.

Similarly, the connector 26 has a first open end 28 and a second open end 32 opposite the first open end.

The hollow tube 16 extends between the enclosure 12 and the hollow connector 26, such that the first aperture 14 in the enclosure 12 is in registry with the first open end 18 of the hollow tube 16 and the second open end 22 of the hollow tube 16 is in registry with the first open end 28 of the hollow connector 26. Thus, a fluid, such as air, can flow from a heating or cooling source 36 such as a household furnace register or the like, into the hollow connector 26 and therefrom through the hollow tube 16 and into the enclosure 12. The hollow tube 16 is removably fastened to the enclosure 12 and to the hollow connector 26 by any convenient means, such as screws, friction fit or the like. Alternately, the hollow tube 16 and the enclosure 12, and/or the hollow tube 16 and the hollow connector 26, may be integrally formed or otherwise fitted to each other. Although not shown, the end 18 of the tube may have a peripheral lip or flange which may slidably be fitted into a depending track formed on the bottom of the floor. In any event, though, the criticality hereto is the effecting of registrant, on between the tube 16 and the aperture (s) 14.

As shown, the connector 26 comprises an open interior housing 26a having a first end 26b having perimeter edge 26c sized and shaped to mate against and abut against a standard residential furnace or heat register 36. The edge 26c may have magnets (not shown) affixed thereonto or otherwise associated therewith for facilitating detachable connection between the register 36 and the enclosure.

The end 18 may have a wide-mouthed connector 27 similar to that of connector 26. The connector 27 has a perimeter substantially equal to the perimeter of the floor 29 of the enclosure 12.

The connector 26 is positioned between the tube 16 and the register 36, with the second open end 32 of the connector 26 in fluid communication with the register 36. The connector 26 is removably fastened to the register 36 by any convenient means, such duct tape or the like.

Figure 4:
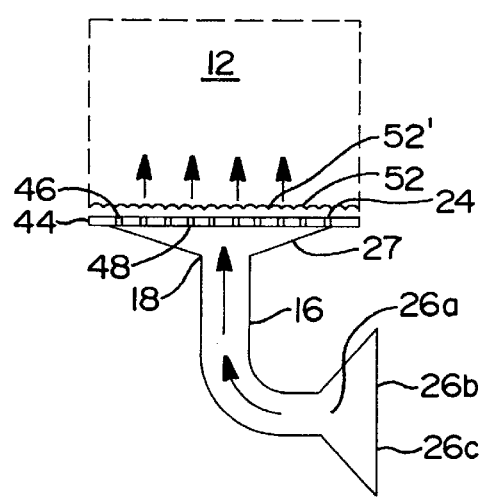
FIG. 4 is a flow diagram of fluid through the apparatus of FIG. 1.

In use, as noted hereinabove and as shown in FIG. 4, forced air flows from the register 36 into the connector 26; from the connector 26 into the tube 16; and from the tube 16 into the enclosure 12. In this way, forced air from the register 36 enters the enclosure 12.

As shown in FIG. 4, the means for conducting air into the enclosure 12 may further comprise a diffusor 44. The diffusor 44 diffuses heat from the first open end 18 of the tube 16 throughout the enclosure 12, rather than having the heat concentrated at the first open end 18 of the tube 16 and the first aperture 14 of the enclosure 12, with which the first open end 18 of the tube 16 is in registry. The diffusor 44 comprises a plate 45 having an upper surface 46 and lower 48. A plurality of channels, 52, 52', etc extend through the plate and conduct air therethrough into the interior of the enclosure. This diffusion of air is a safety feature of the present invention, during heating in that concentrated heat, rather than diffused heat, is more likely to pose a danger to an animal in the enclosure 12 or to the enclosure 12 itself.

Figure 2:
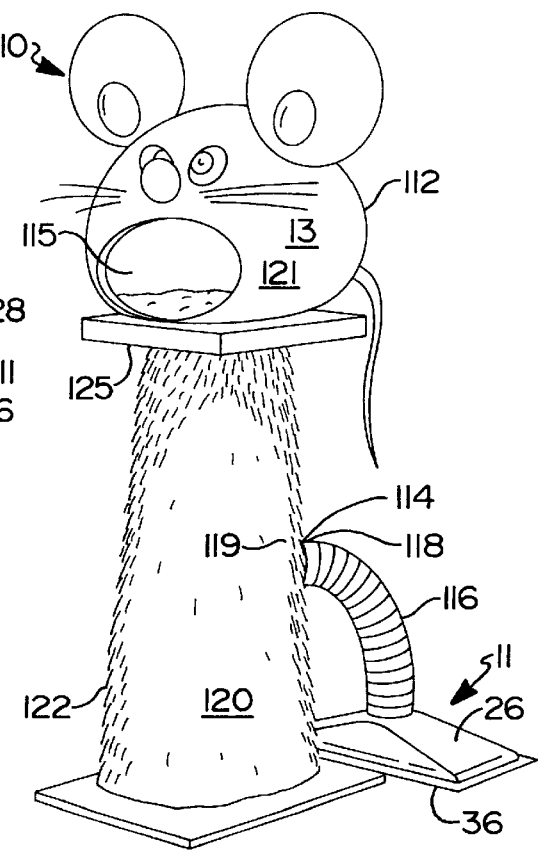
FIG. 2 is an environmental view of a second embodiment of a heated enclosure apparatus for a pet in accordance with the present invention.

In a second embodiment of the present invention, and as shown in FIG. 2, the enclosure 112 has a first member 119 and a second member 121. The second member 121 is seated upon the first member 119. The first member 119 is a hollow pillar 120 and, preferably, has a roughened surface 122 so that it can serve as a scratching post. In this embodiment, the first aperture 114 of the enclosure 112, with which the first open end 118 of the tube 116 is in registry, is provided in the first member 119. A second aperture 115 in the enclosure 112, defines an entry for a pet through which it can enter or leave. The aperture 155 is in the second member 121. The hollow first member 119 and the second member 121 are in fluid communication. In all other respects, the second embodiment is the same as the first embodiment.

Figure 3:
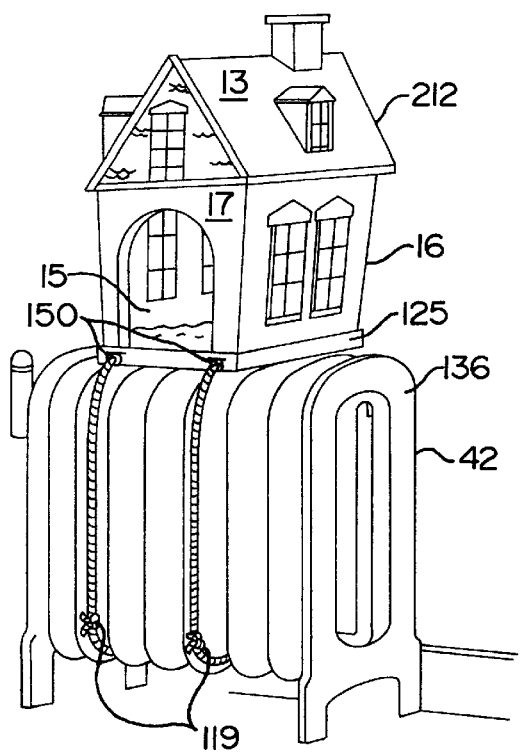
FIG. 3 is an environmental view of a third embodiment of a heated enclosure apparatus for a pet in accordance with the present invention.

In a third embodiment of the present invention, and as shown in FIG. 3, an enclosure 212 is situated atop a heat source 236. An enclosure floor 125 has at least one aperture 150 formed therethrough. The enclosure 212 is held in place atop a heat source 136 via strapping 119 that goes through the at least one aperture 150. The floor 125 is made of a heat-conductive material that resists burning, such as treated wood, fiberglass, or the like, so that the floor 125 does not burn or scorch from its exposure to the heat source 136 while still receiving heat therefrom. In this embodiment, the means for conducting heat into the enclosure 212 comprises the floor 125. In this embodiment, the tube and the connector of the first and second embodiments are eliminated.

It is envisioned that, in all embodiments, the enclosure 12 may take a wide variety of forms. As shown in FIG. 1, the enclosure 12 may take the form of a mailbox. As shown in FIG. 2, the enclosure 112 may take the form of a mouse head mounted on a scratching post. As shown in FIG. 3, the enclosure 212 may take the form of a house. Many other decorative forms of the enclosure are envisioned. Having many forms of the enclosure 12 enhances the utility and attractiveness of the present invention. Moreover, existing enclosures can be retrofitted to accommodate the present invention.

Further, the present invention may be used with a variety of controlled temperature air sources including, for example, forced air sources, such as a wall-mounted heating register; a floor-mounted heating register, a radiator, and the like. It is to be appreciated that the present invention enables both heating and cooling of the interior of the enclosure from pre-existing controlled temperature sources. Likewise, the enclosure may be outdoors by extending the length of the tube 16 through a window, door or the like.

While the invention has been illustrated and described in detail in the drawings and the foregoing description, the same is to be considered as illustrative and not restrictive in character, it being understood that only the preferred embodiment has been shown and described fully and that all changes and modifications that come within the spirit of the invention are desired to be protected.

Having, thus, described the invention, what is claimed is:

1. An enclosure apparatus for an animal, the apparatus comprising:

(a) an enclosure having an open interior and having an egress and an ingress, and a first aperture and a second aperture, and (b) means for conducting controlled temperature air into the enclosure comprising:

(1) a hollow tube, the hollow tube having a first open end and a second open end, the first open end of the hollow tube in registry with a first aperture of the enclosure;

(b) a hollow connector, the hollow connector having a first open end and a second open end, the first open end of the hollow connector in registry with the second open end of the hollow tube, the second open end of the hollow connector removably connectable to a residential heat register;

(c) means for removably connecting the hollow tube to the enclosure; and (d) means for removably connecting the connector to a residential heat register.

2. The apparatus of claim 1 wherein the means for conducting includes a heat transfer member for transferring heat from an air source into the interior of the enclosure.

3. The apparatus of claim 2 wherein the enclosure comprises:

(a) a floor, the floor having a first aperture formed therethrough, air being conducted into the interior of the enclosure through the first aperture;

(b) wall assembly, the wall assembly having a second aperture formed therethrough, the wall assembly cooperating with the floor to define a hollow interior, the second aperture defining the egress and ingress, and (c) means for joining the floor to the wall.

4. The apparatus of claim 3 wherein the means for conducting air further comprises a diffuser, the diffuser in registry with the first open end of the hollow tube.

5. The apparatus of claim 3 further comprising a grate overlying the first aperture in the enclosure.

6. The apparatus of claim 5 wherein the enclosure comprises:

(a) a hollow pillar and (b) a house, the house seated atop the pillar, the interior of the house in fluid communication with the interior of the pillar, the means for conducting, conducting air from a source into the interior of the pillar and therefrom into the house.

7. The apparatus of claim 6 wherein the pillar has a roughened exterior surface.

8. An enclosure apparatus for an animal, the apparatus comprising:

(a) an enclosure comprising:

(1) a hollow pillar and (2) a house, the house comprising:

(i) a floor, the floor having a first aperture formed therethrough for conducting air into the interior of the enclosure through the first aperture;

(ii) a grate overlying the first aperture, (iii) a wall assembly, the wall assembly having a second aperture formed therethrough, the wall assembly cooperating with the floor to define a hollow interior, the second aperture defining an egress and ingress, (iv) means for joining the floor to the wall, the house seated atop the pillar, the interior of the house in fluid communication with the interior of the pillar and;

(b) a means for conducting air from a source into the interior of the pillar and therefrom into the home.

9. The apparatus of claim 8 wherein the pillar has a roughened exterior surface.

* * * * *